US010135353B2

(12) United States Patent
Mir

(10) Patent No.: US 10,135,353 B2
(45) Date of Patent: Nov. 20, 2018

(54) UNIDIRECTIONAL MATRIX CONVERTER WITH REGENERATION SYSTEM

(71) Applicant: EATON CORPORATION, Cleveland, OH (US)

(72) Inventor: Sayeed Ahmad Mir, Saginaw, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/115,328

(22) PCT Filed: Jan. 30, 2015

(86) PCT No.: PCT/US2015/013773
§ 371 (c)(1),
(2) Date: Jul. 29, 2016

(87) PCT Pub. No.: WO2015/116931
PCT Pub. Date: Aug. 6, 2015

(65) Prior Publication Data
US 2017/0005586 A1 Jan. 5, 2017

Related U.S. Application Data

(60) Provisional application No. 61/933,914, filed on Jan. 31, 2014.

(51) Int. Cl.
*H02M 5/458* (2006.01)
*H02M 1/44* (2007.01)
(Continued)

(52) U.S. Cl.
CPC .......... *H02M 5/4585* (2013.01); *B60L 1/003* (2013.01); *B60L 11/123* (2013.01); *B60L 15/007* (2013.01);
(Continued)

(58) Field of Classification Search
CPC ....... H02M 5/4585; H02M 5/458; H02M 1/44
(Continued)

(56) References Cited

U.S. PATENT DOCUMENTS 4,788,485 A * 11/1988 Kawagishi ............ H02M 1/425
318/807
2001/0017239 A1 8/2001 Tajima et al.
(Continued)

OTHER PUBLICATIONS

Blanding, D., "Subsystem Design and Integration for the More Electric Aircraft", 25th International Congress of the Aeronautical Sciences, (2006), 1-8.
(Continued)

*Primary Examiner* — Kyle J Moody
(74) *Attorney, Agent, or Firm* — Merchant & Gould P.C.

(57) ABSTRACT

An AC-to-AC matrix converter includes a controlled rectifier input stage, an inverter output stage, and a regenerative unit. The controlled rectifier input stage is electrically connected to a power source and configured to convert AC input power from the power source into DC power. The controlled rectifier input stage may be unidirectional. The inverter output stage is electrically connected to a load and operates to convert the DC power into AC output power, which is then fed into the load. The regenerative unit is electrically connected to the inverter output stage and operates control energy generated by the load in a regenerative mode within the inverter output stage. The controlled rectifier input stage may be isolated from the inverter output stage in the regenerative mode.

29 Claims, 7 Drawing Sheets

(51) Int. Cl.
*B60L 1/00* (2006.01)
*B60L 11/12* (2006.01)
*B60L 15/00* (2006.01)
*B60L 15/20* (2006.01)

(52) U.S. Cl.
CPC .............. B60L 15/20 (2013.01); H02M 1/44 (2013.01); H02M 5/458 (2013.01); *B60L 2200/10* (2013.01); *B60L 2210/20* (2013.01); *Y02T 10/6217* (2013.01); *Y02T 10/645* (2013.01); *Y02T 10/7077* (2013.01); *Y02T 10/725* (2013.01); *Y02T 10/7275* (2013.01)

(58) Field of Classification Search
USPC ..................................................... 363/34, 37
See application file for complete search history.

(56) References Cited

U.S. PATENT DOCUMENTS

| | | | |
|---|---|---|---|
| 2004/0245952 A1 | 12/2004 | Yamada et al. | |
| 2006/0033466 A1* | 2/2006 | Yamada | H02P 23/06 318/800 |
| 2008/0031019 A1* | 2/2008 | Alexander | H02M 3/1582 363/37 |
| 2009/0086515 A1* | 4/2009 | Sakakibara | H02M 5/4585 363/37 |
| 2010/0067264 A1* | 3/2010 | Ohashi | H02M 5/4585 363/37 |
| 2011/0025246 A1* | 2/2011 | Sakakibara | H02M 1/4216 318/400.42 |
| 2012/0063178 A1* | 3/2012 | Fujita | H02M 5/4585 363/37 |
| 2012/0201056 A1* | 8/2012 | Wei | H02M 5/4585 363/37 |
| 2013/0279214 A1* | 10/2013 | Takase | H02M 7/68 363/37 |
| 2015/0049526 A1* | 2/2015 | Kagimura | H02M 5/4585 363/50 |
| 2015/0117073 A1* | 4/2015 | Flett | H02M 5/4585 363/37 |
| 2016/0226423 A1* | 8/2016 | Watabu | H02P 27/06 |
| 2017/0005586 A1* | 1/2017 | Mir | H02M 5/458 |

OTHER PUBLICATIONS

Kolar, J. et al., "Novel-Three-Phase AC-AC Sparse Matrix Converters", IEEE Transactions on Power Electronics, (2007), 22(5): 1649-1661.

Lee, E., et al., "High Performance Current Controller for Sparse Matrix Converter Based on Model Predictive Control", J. Electr Technol, (2013), 8(5): 1138-1145.

Park, K. et al., "A Z-source Sparse Matrix Converter with a Fuzzy Logic Controller based Compensation Method under Abnormal Input Voltage Conditions", 2010 IEEE International Symposium on Industrial Electronics, (2010), 614-619.

Wei, L. et al., "Matrix Converter Topologies with Reduced Number of Switches", IEEE 33rd Annual Power Electronics Specialists Conference, (2002), 1: 57-63.

International Search Report for corresponding International Patent Application No. PCT/US2015/013773 dated Apr. 30, 2015, 3 pgs.

\* cited by examiner

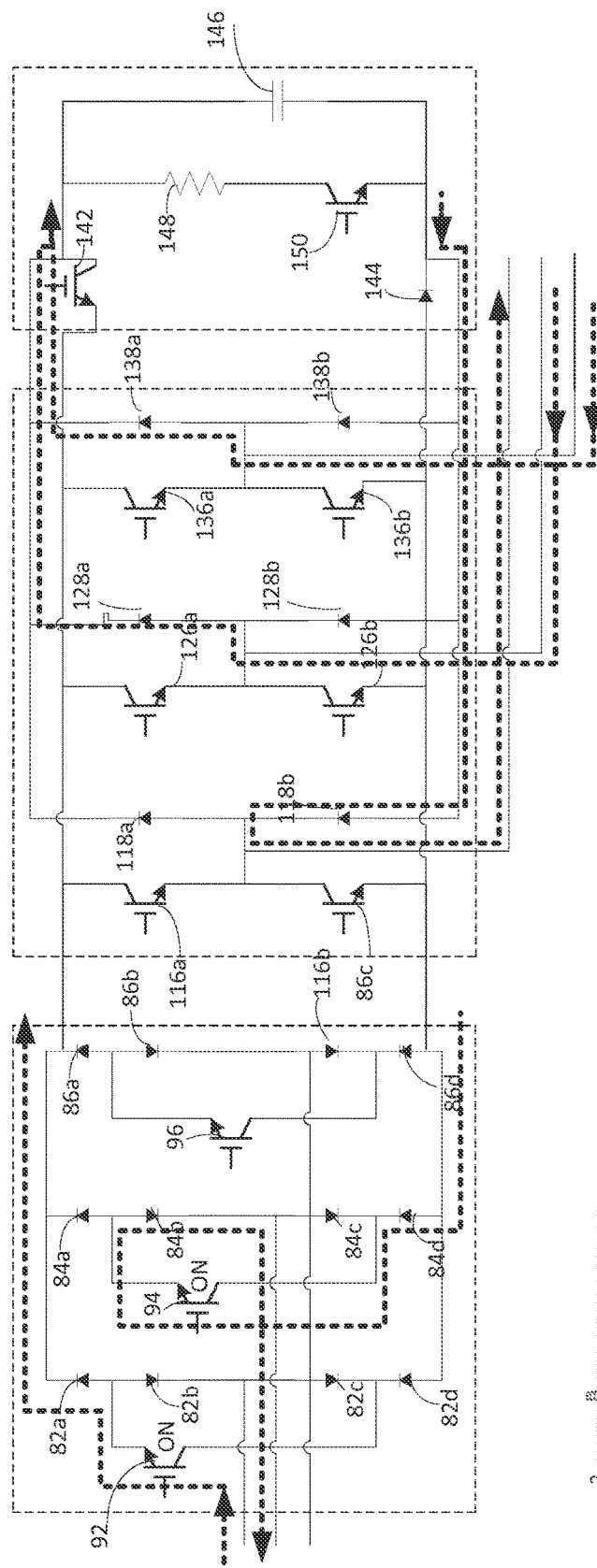
FIG. 6
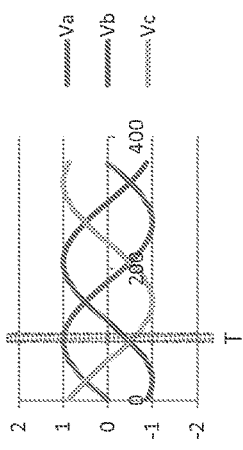

UNIDIRECTIONAL MATRIX CONVERTER WITH REGENERATION SYSTEM

CROSS-REFERENCE TO RELATED APPLICATION(S)

This application is a National Stage of PCT/US2015/013773, filed on Jan. 30, 2015, which claims benefit of U.S. Patent Application Ser. No. 61/933,914 filed on Jan. 31, 2014, and which applications are incorporated herein by reference. To the extent appropriate, a claim of priority is made to each of the above disclosed applications.

BACKGROUND

Conversion of electrical power from an input AC form to an output AC form is extensively used in industrial applications. One example of the applications is the aerospace industry in which electrical power is utilized to operate aircraft subsystems. Most of the aircraft subsystems are driven by variable speed motors that are controlled by varying motor input frequency and voltage. To drive these motors at a predetermined speed and/or torque, an aircraft AC power supply, which is typically 115/220 V (three-phase 400-800 Hz), is converted into an motor input power with variable frequency and voltage.

In several applications, three-phase bidirectional converters have been employed. Conventional converters include three-phase PWM inverters coupled to a DC-link that provides reactance, such as a capacitor or inductor, for back-to-back voltage or current source configurations. Such converters include two stages for conversion, the first of which converts three-phase AC to DC, and the second of which converts DC to three-phase output AC having variable voltage and/or frequency. For example, the converter includes a transformer rectifier unit (TRU) and an inverter with a capacitor interposed at a therebetween. The TRU operates to convert an aircraft AC power provided by a power source into DC power and eliminates the current harmonics created by the rectification of the AC to DC power. The inverter operates to converts the DC power into AC input power with variable frequency and voltage. The DC-link is impressed by the capacitor, which can decouple both the TRU and the inverter for control purposes.

However, the conventional converters could stand improvement with regard to meeting the demand for high power density by the aircraft applications because the two-stage conversions do not have sufficient energy efficiency, and because transformer rectifier units and the DC-line energy storage elements, such as a capacitor or inductor, are heavy and have a large physical volume and reduces a system lifetime. Thus, there is a continuing need for improved power converter topologies that provide high efficiency in converting input AC power to output AC power and achieve high power density that is required in aircraft applications.

SUMMARY

In general terms, this disclosure is directed to a matrix converter. In one possible configuration and by non-limiting example, the matrix converter includes regenerative circuitry. Various aspects are described in this disclosure, which include, but are not limited to, the following aspects.

One aspect is a matrix converter including a controlled rectifier input stage, an inverter output stage, and a regenerative unit. The controlled rectifier input stage is electrically connected to a power source and configured to convert AC input power from the power source into DC power. The switching of the controlled rectifier stage is controlled so as to profile the input line current for eliminating the current harmonics. The controlled rectifier input stage may be unidirectional. The inverter output stage is electrically connected to a load and operates to convert the DC power into AC output power, which is then fed into the load. The regenerative unit is electrically connected to the inverter output stage and operates control energy generated by the load in a regenerative mode within the inverter output stage. The rectifier input stage may be isolated from the inverter output stage in the regenerative mode. The isolation may be achieved by series connected diodes between the input controlled rectifier and the regenerative stage.

The regenerative unit may include an energy dissipating element configured to dissipate the energy generated by the load in the regenerative mode. The energy dissipating element may be a resistor. The regenerative unit may also include an energy storing element configured to store the energy generated by the load in the regenerative mode. The energy storing element may be a capacitor. The regenerative unit may be configured to deliver the energy stored in the energy storing element to the load through the inverter output stage when a voltage across the energy storing element is greater than a threshold. The threshold may be greater than a voltage of the DC power.

In some examples, the energy dissipating element is connected in series with the switch element. The energy storing element is arranged in parallel with the series of the energy dissipating element and the switch element. A control unit may be configured to control the switch element to adjust a voltage across the energy storing element. The switch element is a three-terminal power semiconductor device, such as an insulated gate bipolar transistor (IGBT) or MOSFET. The regenerative unit may operate to deliver the energy generated by the load in the regenerative mode into the load. In certain examples, a control element (e.g., an intermediate switch element) is connected to control the feeding of the energy stored in the energy storing element back to the load through the inverter output stage.

Another aspect is a matrix converter including a three-phase AC input connection, a three-phase AC output connection, a controlled rectifier input stage, an inverter output stage, and a regenerative unit. The three-phase AC input connection has first, second, and third input terminals for receiving three-phase AC input power from a power source. The three-phase AC output connection has first, second, and third output terminals for providing three-phase AC output power to a load. The controlled rectifier input stage has first, second, and third input leg circuits and first and second DC links. The first, second, and third input leg circuits are electrically connected to the first, second, and third input terminals, respectively, and electrically connected to the first and second DC links. The first, second and third input leg circuits are configured to convert the three-phase AC input power into DC power and provide the DC power to the first and second DC links. The inverter output stage has first, second, and third output leg circuits. The first, second, and third output leg circuits are electrically connected to the first and second DC links and electrically connected to the first, second, and third output terminals, respectively. The first, second and third output leg circuits are configured to convert the DC power from the first and second DC input terminals into the three-phase AC output power and provide the three-phase AC output power to the first, second, and third output terminals.

The regenerative unit is electrically connected to the first, second, and third output leg circuits of the inverter output stage and configured to control energy generated by the load in a regenerative mode within the inverter output stage. In some examples, each of the first, second, and third input leg circuits of the controlled rectifier input stage is configured to be unidirectional.

Yet another aspect is a method of regenerate electrical energy from a load in a unidirectional matrix converter. The unidirectional matrix converter includes a controlled rectifier input stage and an inverter output stage. The method includes receiving, by the controlled rectifier input stage, AC input power from a power source; converting, by the controlled rectifier input stage, the AC input power to DC power; converting, by the inverter output stage, the DC power to AC output power; deliver the AC output power to a load; receiving, by regenerative circuitry, power generated by the load in a regenerative mode of operation; dissipating, by the regenerative circuitry, the received power at an energy dissipating element in the regenerative mode. The method may include storing, by the regenerative circuitry, the received power into an energy storing element in the regenerative mode; and delivering the stored energy to the load through the inverter output stage in the regenerative mode, wherein the controlled rectifier input stage is isolated from the inverter output stage in the regenerative mode. The method may further include adjusting an amount of energy stored in the energy storing element by dissipating a portion of the energy generated by the load at the energy dissipating element.

BRIEF DESCRIPTION OF THE DRAWINGS

FIG. 6 is a circuit diagram of the matrix converter of FIG. 2, illustrating a regenerative mode of operation of the matrix converter.

DETAILED DESCRIPTION

Figure 1:
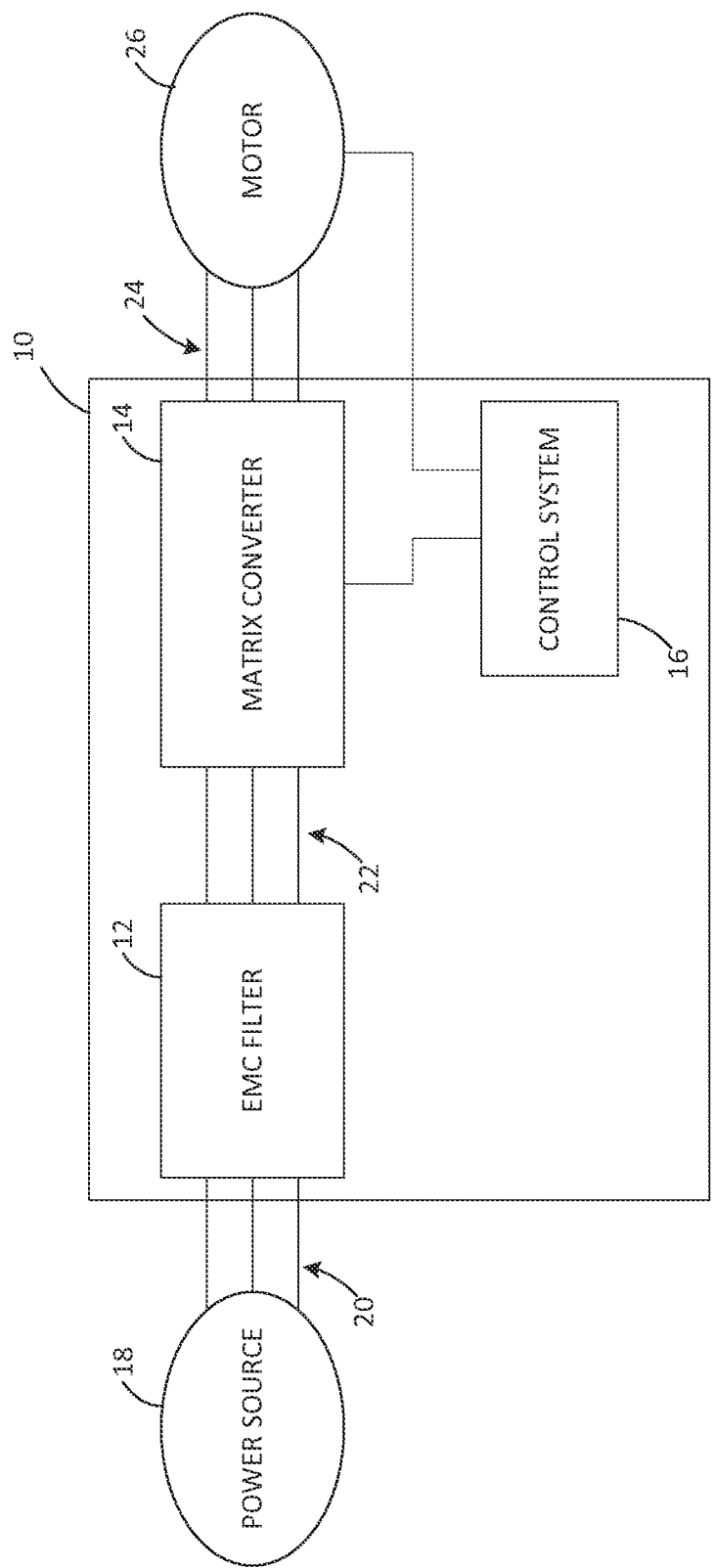
FIG. 1 is a schematic diagram of an exemplary conversion system according to the principles of the disclosure.

FIG. 1 is a schematic diagram of an exemplary conversion system 10 according to the principles of the disclosure. The conversion system 10 is configured to convert three-phase AC input power to three-phase AC output power with high power density and efficiency. In some examples, the conversion system 10 includes an electromagnetic compatibility (EMC) filter 12, a matrix converter 14, a id a control system 16.

The EMC filter 12 operates to reduce or eliminate electromagnetic interference (EMI) caused by/to other components within or adjacent the system 10. The EMC filter 12 is electrically connected to a power source 18. In this example, the power source 18 provides three-phase AC power 20. In aircraft applications, for example, the power source 18 can be AC power having 115/220 V with a frequency between 400 and 800 Hz, which can be generated by an aircraft engine. The EMC filter 12 is also electrically connected to the matrix converter 14 and provides filtered AC input power 22 to the matrix converter 14.

The matrix converter 14 operates to convert the filtered, three-phase AC input power 22 to three-phase AC output power 24, which is then fed into a load 26. In some examples, the load 26 can be a three-phase AC or BLDC/PMSM motor, which is driven by the three-phase AC output power 24 from the matrix converter 14. In the following examples, the load 26 is described primarily as the three-phase AC or BLDC/PMSM motor. However, in other examples, the load 26 can be of any type suitable to receive and consume the three-phase AC output power 24. As described below, the matrix converter 14 can operate to provide three-phase AC output power 24 with variable frequency and voltage. Thus, the matrix converter 14 can be used to drive several types of motors with different frequencies and voltages, such as small high speed motors. In aerospace applications, for example, the motor 26 can be used to actuate different types of aircraft subsystems that implement the More Electric Aircraft (MEA) technologies.

The control system 16 operates to control the matrix converter 14 to convert the AC input power 22 to the AC output power 24 in a predetermined manner. As described below, the matrix converter 14 includes a plurality of switching devices. The control system 16 is electrically connected to the switching devices and configured to control each of the switching devices with a predetermined logic or algorithm. Such logic or algorithm can be implemented based upon several factors, such as phases of the AC input power 22 with respect to time. In some examples, the control system 16 is also electrically connected to the motor 26 to detect operational parameters of the load 26, such as speed and torque.

As described below, the control system 16 can also detect whether the motor 26 is in a regenerative mode. In the regenerative mode, the motor 26 ceases to consume power supplied from the power source 18 and generates power. In some examples, the motor 26 can be in the regenerative mode when the motor 26 decelerates or is driven backward.

Figure 2:
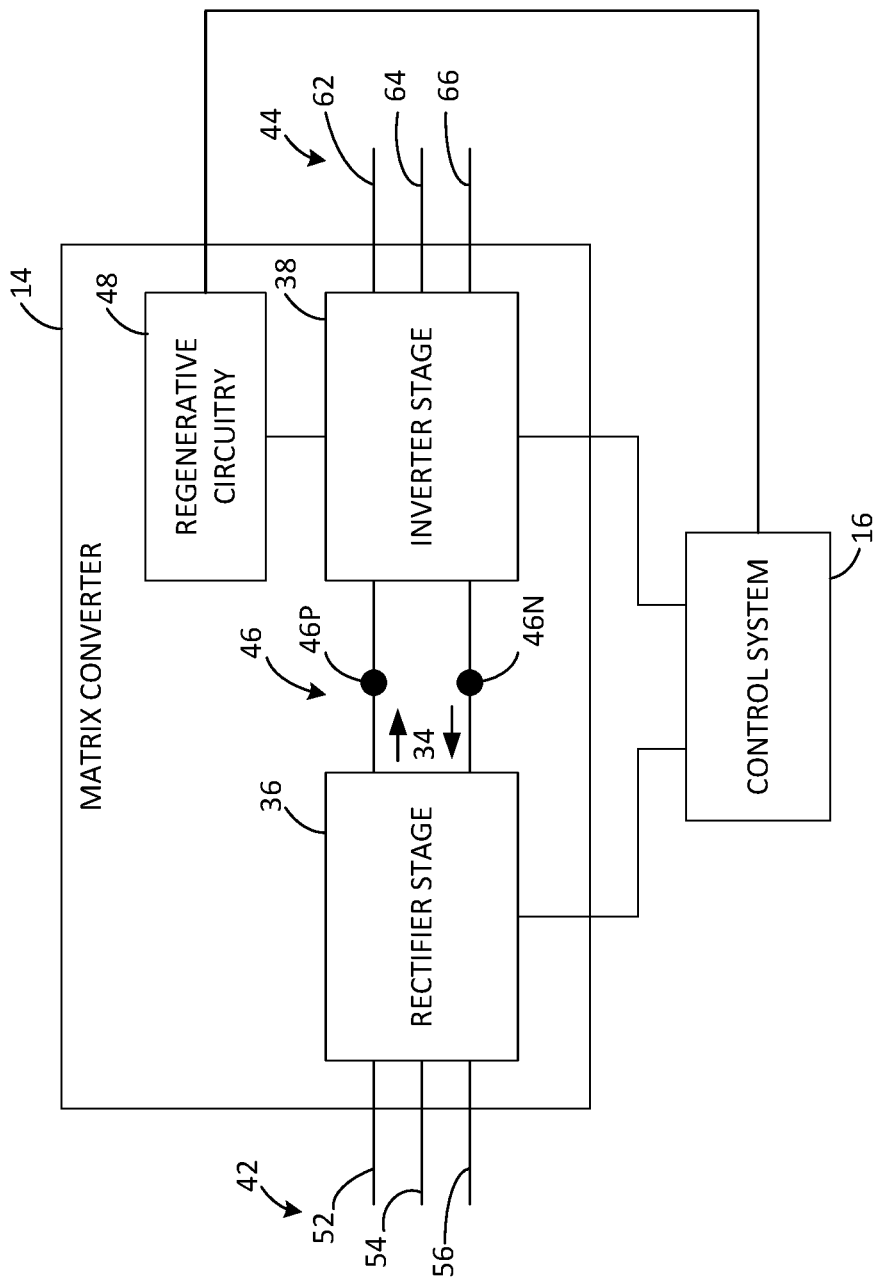
FIG. 2 is a schematic diagram of an exemplary matrix converter according to the principles of the disclosure.

FIG. 2 is a schematic diagram of an exemplary matrix converter 14 according to the principles of the disclosure. In some examples, the matrix converter 14 employs two-stage energy conversion system 32, which converts the AC input power 22 to DC power 34 in the first stage and converts the DC power 34 to the AC output power 24 in the second stage. The two-stage energy conversion system 32 includes a controlled rectifier input stage 36 and an inverter output stage 38. Furthermore, the matrix converter 14 includes a three-phase input connection 42, a three-phase output connection 44, a pair of intermediate DC links 46 and regenerative circuitry 48.

The three-phase input connection 42 is configured to be electrically connected to the terminals of the power source 18 with three phases. The three-phase input connection 42 includes first, second, and third input terminals 52, 54 and 56, which are electrically connected to three terminals of the power source 18, respectively, and receive the three-phase AC input power 22 from the power source 18.

The three-phase output connection 44 is configured to be electrically connected to the terminals of the three-phase motor 26. The three-phase output connection 44 includes first, second, and third output terminals 62, 64 and 66, which are electrically connected to three terminals of the motor 26, respectively, and provide the three-phase AC output power 24 to the motor 26.

The controlled rectifier input stage 36 operates as the first stage of the two-stage energy conversion system 32. The controlled rectifier input stage 36 is electrically connected to the three-phase input connection 42 and the intermediate DC links 46. The controlled rectifier input stage 36 receives the AC input power 22 through the three-phase input connection 42, converts the AC input power 22 to the DC power 34, and provide the DC power 34 to the inverter output stage 38 through the intermediate DC links 46. In this example, the controlled rectifier input stage 36 is configured to be unidirectional, as described in further detail with reference to FIG. 3. As described below, the controlled rectifier input stage 36 includes a plurality of switch elements that is controlled by the control system 16 to rectify the three-phase AC input power 22 to the DC power 34 such that the current harmonics in the three phase ac input current due to the rectification are reduced or eliminated.

The inverter output stage 38 operates as the second stage of the two-stage energy conversion system 32. The inverter output stage 38 is electrically connected to the intermediate DC links 46 and the three-phase output connection 44. The inverter output stage 38 receives the DC power 34 through the intermediate DC links 46, converts the DC power 34 to the AC output power 24, and provide the AC output power 24 to the motor 26 through the three-phase output connection 44. As described below, the inverter output stage 38 includes a plurality of switch elements that is controlled by the control system 16 to convert the DC power 34 to the three-phase AC output power 24.

The pair of intermediate DC links 46 is configured to connect the controlled rectifier input stage 36 to the inverter output stage 38 therethrough. The intermediate DC links 46 include a positive polarity DC link 46P and a negative polarity DC link 46N. As described below, the controlled rectifier input stage 36 is configured to be unidirectional, and thus the DC power 34 maintains the same polarity at the intermediate DC links 46. In particular, the DC power 34 has positive polarity at the positive polarity DC link 46P and negative polarity at the negative polarity DC link 46N. Unlike conventional converters, the matrix converter 14 does not require a reactance, such as a capacitor, arranged at the DC intermediate links 46. The elimination of such a reactance is advantageous because it reduces the weight of the conversion system 10 and improves the power density of the system 10.

The regenerative circuitry 48 operates to manage energy generated by the motor 26 when the motor 26 is in the regenerative mode, such as when the motor 26 decelerates and stops consuming the AC input power 22 drawn from the power source 18. As the controlled rectifier input stage 36 is unidirectional, the matrix converter 14 is not capable of managing the regenerative energy from the motor 26 in the regenerative mode. Therefore, the matrix converter 14 requires the regenerative circuitry 48 to perform regeneration of energy generated by the motor 26. In some examples, the regenerative circuitry 48 is electrically connected to the inverter output stage 38 so that the circuitry 48 can draw the regenerative power from the motor 26 in the regenerative mode. In other examples, the regenerative circuitry 48 also operates to store the regenerative power from the motor 26 and return the stored energy to the motor 26. The regenerative circuitry 48 is configured to have no effect on the intermediate DC links 46, the controlled rectifier input Mage 36, and the three-phase input connection 42. The regenerative circuitry 48 is described in further detail with reference to FIG. 4.

Figure 3:
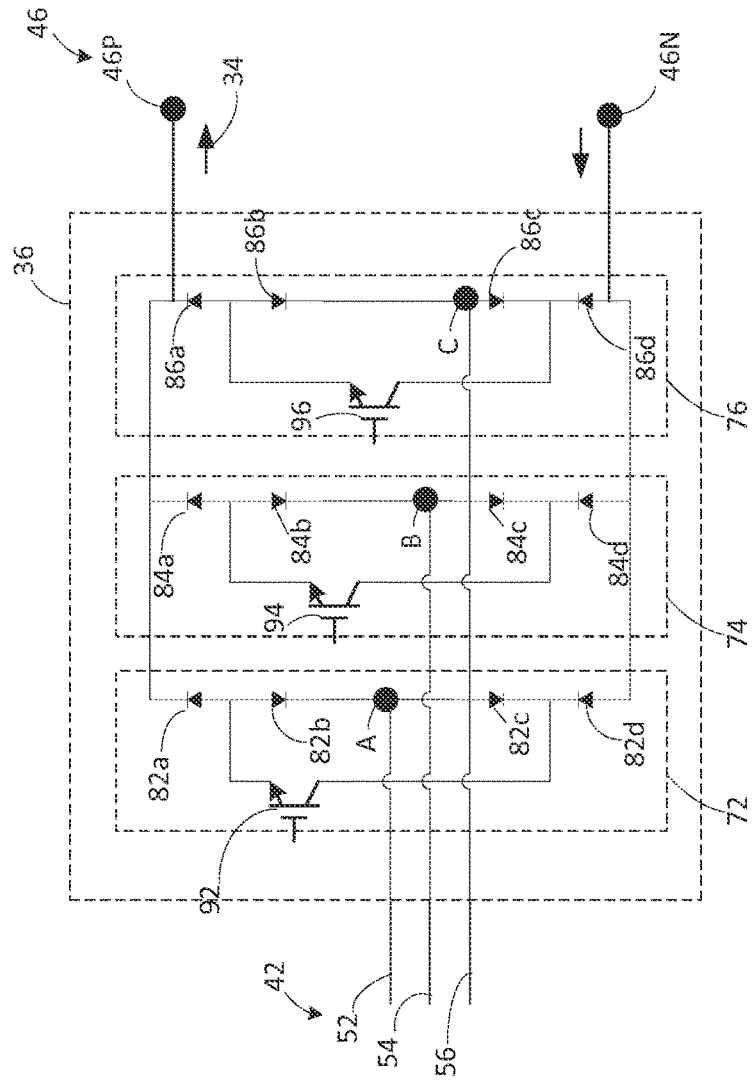
FIG. 3 is a circuit diagram of an exemplary controlled rectifier input stage of the matrix converter 14 of FIG. 2.

FIG. 3 is a circuit diagram of an exemplary controlled rectifier input stage 36 of the matrix converter 14 of FIG. 2. The controlled rectifier input stage 36 includes first, second and third input leg circuits 72, 74 and 76, which are connected in parallel. The first, second and third input leg circuits 72, 74 and 76 are connected to the first, second and third input terminals 52, 54 and 56 of the three-phase input connection 42 at first, second and third junctions A, B and C, respectively. Each of the input leg circuits 72, 74 and 76 is also connected to the positive polarity DC link 46P and the negative polarity DC link 46N of the intermediate DC links 46.

Each of the input leg circuits 72, 74 and 76 includes four diodes and one switch element. For example, the first leg circuit 72 includes four diodes 82a, 82b, 82c and 82d and a switch element 92. The four diodes 82a, 82b, 82c and 82d are arranged in order and connected in series with each other. A first diode 82a and a second diode 82b face opposite each other, and a third diode 82c and a fourth diode 82d face opposite each other. In this example, the cathode of the first diode 82a is connected to the positive polarity DC link 46P, and the anode of the first diode 82a is connected to the anode of the second diode 82b. The cathode of the second diode 82b is connected to the anode of the third diode 82c, and the cathode of the third diode 82c is connected to the cathode of the fourth diode 82d. The anode of the fourth diode 82d is connected to the negative polarity DC link 46N. The junction A, at which the first input terminal 52 of the three-phase input connection 42 is connected to the first input leg circuit 72, is arranged between the second diode 82b and the third diode 82c.

The first input leg circuit 72 also includes the switch element 92. The switch element 92 can be of any type suitable for controlling current flow. The switch element can be an IGBT, MOSFET, BJT, MCT, GTO or any other controllable switch element. In the following description, the switch element is primarily illustrated as an IGBT. The IGBT 92 is connected in parallel to the series of the four diodes 82a, 82b, 82c and 82d. For example, the emitter of the IGBT 92 is connected between the first diode 82a and the second diode 82b. In particular, the emitter of the IGBT 92 is connected to the anode of the first diode 82a and the anode of the second diode 82b. The collector of the IGBT 92 is connected between the third diode 82c and the fourth diode 82d. In particular, the collector of the IGBT 92 is connected to the cathode of the third diode 82c and the cathode of the fourth diode 82d.

The second and third input leg circuits 74 and 76 are arranged in the same configuration as the first input leg circuit 72, and the description thereof is omitted for brevity purposes.

The IGBTs 92, 94 and 96 are connected to the control system 16 or another control unit, which provides switching control signals to the IGBTs 92, 94 and 96 to convert the AC input power 22 from the three-phase input connection 42 to output the DC power 34 at the intermediate DC links 46. The control system 16 can be operated in any manner, such as logic, processor-based circuits, software, firmware, or combinations of hardware and software, to selectively operate the IGBTs 92, 94 and 96 for controlled AC-to-DC conversion with the input current harmonics elimination or reduction. In sonic examples, the control system 16 can be a pulse width modulation (PWM) type providing three different switching control signals to the IGBTs 92, 94 and 96, respectively.

Figure 4:
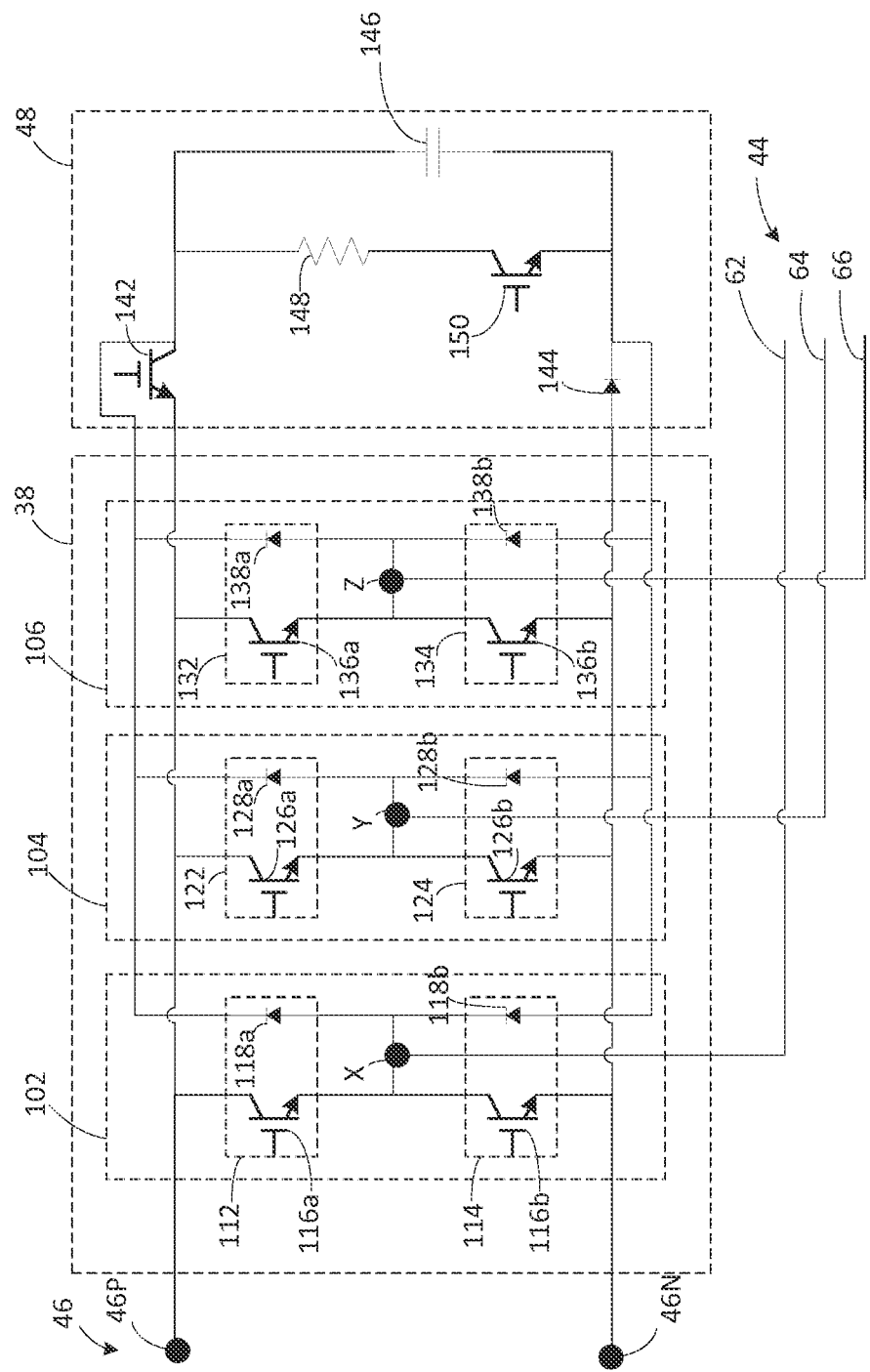
FIG. 4 is a circuit diagram of an exemplary inverter output stage with exemplary regenerative circuitry of FIG. 2.

FIG. 4 is a circuit diagram of an exemplary inverter output stage 38 with exemplary regenerative circuitry 48 of FIG. 2.

The inverter output stage 38 includes first, second and third output leg circuits 102, 104 and 106, which are connected in parallel. The first, second and third output leg circuits 102, 104 and 106 are connected to the first, second and third output terminals 62, 64 and 66 of the three-phase output connection 44 at first, second and third junctions X, Y and Z, respectively. Each of the output leg circuits 102, 104 and 106 is also connected to the positive polarity DC link 46P and the negative polarity DC link 46N of the intermediate DC links 46. As the first, second and third output leg circuits 102, 104 and 106 have the same configuration, the first output leg circuit 102 is only described hereinafter, and the description for the second and third output leg circuits 104 and 106 is omitted for brevity purposes.

The first input leg circuit 102 includes an upper arm 112 and a lower arm 114, which are connected in series. The upper arm 112 includes a unidirectional switch element 116a and an anti-parallel diode 118a. The lower arm 114 includes a unidirectional switch element 116b and an anti-parallel diode 118b. One example of the switch elements 116a and 116b is an IGBT. Although the switch element is primarily illustrated as an IGBT, it can be of any type suitable for unidirectional control.

The IGBT 116a has its collector connected to the positive polarity DC link 46P and Its emitter connected to the collector of the IGBT 116b. The emitter of the IGBT 116b is connected to the negative polarity DC link 46N. The anti-parallel diode 118a is connected to the positive polarity DC link 46P through an intermediate unidirectional switch 142 in series, and the IGBT 116a is connected in parallel with the series of the anti-parallel diode 118a and the intermediate unidirectional switch 142. In particular, the anode of the diode 118a is connected to the emitter of the IGBT 116a and the cathode of the diode 118a is connected to the collector of the intermediate unidirectional switch 142. The emitter of the intermediate unidirectional switch 142 is connected to the collector of the IGBT 116a. Similarly, the anti-parallel diode 118b is connected to a intermediate diode 144 in series, and the IGBT 116b is connected in parallel with the series of the anti-parallel diode 118b and the intermediate diode 144. In particular, the cathode of the diode 118b is connected to the collector of the IGBT 116b, and the anode of the diode 1181 is connected to the cathode of the intermediate diode 144. The anode of the intermediate diode 144 is connected to the emitter of the IGBT 116b. The junction X, at which the first output leg circuit 102 is connected to the first output terminal 62 of the three-phase output connection 44, is arranged between the upper arm 112 and the lower arm 114. In some examples, the intermediate unidirectional switch 142 is an IGBT. In other examples, other switch elements that do not have parasitic antiparallel diode can be used.

The IGBTs 116a, 116b, 126a, 126b, 136a and 136b are connected to the control system 16 or another control unit, which provides switching control signals to the IGBTs 116a, 116b, 126a, 126b, 136a and 136b to convert the DC power 34 from the intermediate DC links 46 to output the AC output power 24 through the three-phase output connection 44. As described above, the control system 16 can be operated in any manner, such as logic, processor-based circuits, software, firmware, or combinations of hardware and software, to selectively operate the IGBTs 116a, 116b, 126a, 126b, 136a and 136b for controlled DC-to-AC conversion. In some examples, the control system 16 can be a pulse width modulation (PWM) type providing three different switching control signals to the IGBTs 116a, 116b, 126a, 126b, 136a and 136b, respectively.

The matrix converter 14 further includes the regenerative circuitry 48 to manage power generated by the motor 26 when the motor 26 operates in the regenerative mode. In some examples, the regenerative circuitry 48 includes an intermediate unidirectional switch 142 and an intermediate diode 144, an energy storing element 146, an energy dissipating element 148, and an energy adjusting switch element 150.

The intermediate unidirectional switch 142 and the intermediate diode 144 are connected to all of the first, second and third output leg circuits 102, 104 and 106, and configured to route current flow from the motor 26 to the energy storing element 146 and/or the energy dissipating element 148 when the motor 26 is in the regenerative mode. Furthermore, the intermediate unidirectional switch 142 and the intermediate diode 144 permit energy stored in the energy storing element 146 to be fed back to the motor 26 through the intermediate unidirectional switch 142 and the intermediate diode 144 when a voltage across the energy storing element 146 is greater than a voltage across the intermediate DC links 46. The intermediate unidirectional switch 142 can be controlled to allow the energy stored in the energy storing element 146 to flow back to the load and maintain the level of voltage across the energy storing element 146.

In this example, the collector of the intermediate unidirectional switch 142 is connected to the cathodes of the diodes 118a, 128a and 138a of the upper arms 112, 122 and 132, and the emitter of the intermediate unidirectional switch 142 is connected to the collector of the IGBTs 116a, 126a and 136a of the upper arms 112, 122 and 132. The cathode of a intermediate diode 144 is connected to the anodes of the diodes 118b, 128b and 138b of the lower arms 114, 124 and 134, and the anode of the intermediate diode 144 is connected to the emitter of the IGBTs 116b, 126b and 136b of the lower arms 114, 124 and 134.

The energy storing element 146 is connected in parallel with the inverter output stage 38. In particular, the energy storing element 146 is connected between the collector of the intermediate unidirectional switch 142 (or the cathodes of the diodes 118a, 128a and 138a) and the cathode of the intermediate diode 144 (of the anodes of the diodes 118b, 128b and 138b). One example of the energy storing element 146 is a capacitor. In this configuration, energy generated by the motor 26 in the regenerative mode can flow into the energy storing element 146 through predetermined paths defined by some of the diodes 118a, 118b, 128a, 128b, 138a and 138b. This is implemented without operation of any of the IGBTs 116a, 116b, 126a, 126h, 136a and 136b. Furthermore, when a voltage across the energy storing element 146 is greater than a predetermined threshold, the energy stored in the energy storing element 146 can be delivered back to the motor 26 through the intermediate unidirectional switch 142 and the intermediate diode 144 and some of the diodes 118a, 118b, 128a, 128b, 138a and 138b by operating some of the IGBTs 116a, 116b, 126a, 126b, 136a and 136b. The flow of energy is controlled by controlling the operation of the intermediate unidirectional switch 142. One example of the intermediate unidirectional switch 142 is an IGBT. In other examples, other switch elements that do not have parasitic antiparallel diode can be used.

In some examples, the regenerative circuitry 48 includes the energy dissipating element 148 and the energy adjusting switch element 150, which are connected in series with each other and are connected to the energy storing element 146 in parallel. One example of the energy dissipating element 148 is a resistor. One example of the energy adjusting switch element 150 is an IGBT. A MOSFET may be preferred in certain cases for faster switching. The energy dissipating element 148 operates to set a voltage across the energy storing element 146 by controlling the energy adjusting switch element 150. For example, if the voltage across the energy storing element 146 is greater than a predetermined voltage, the energy adjusting switch element 150 can be turned on so that a portion of the energy stored in the energy storing element 146 or flowing from the inverter output stage 38 dissipates at the energy dissipating element 148 until the voltage across the energy storing element 146 remains at the predetermined voltage. The energy adjusting switch element 150, such as an IGBT, can be controlled by the control system 16 or another control unit to maintain the predetermined voltage across the energy storing element 146.

Figure 5:
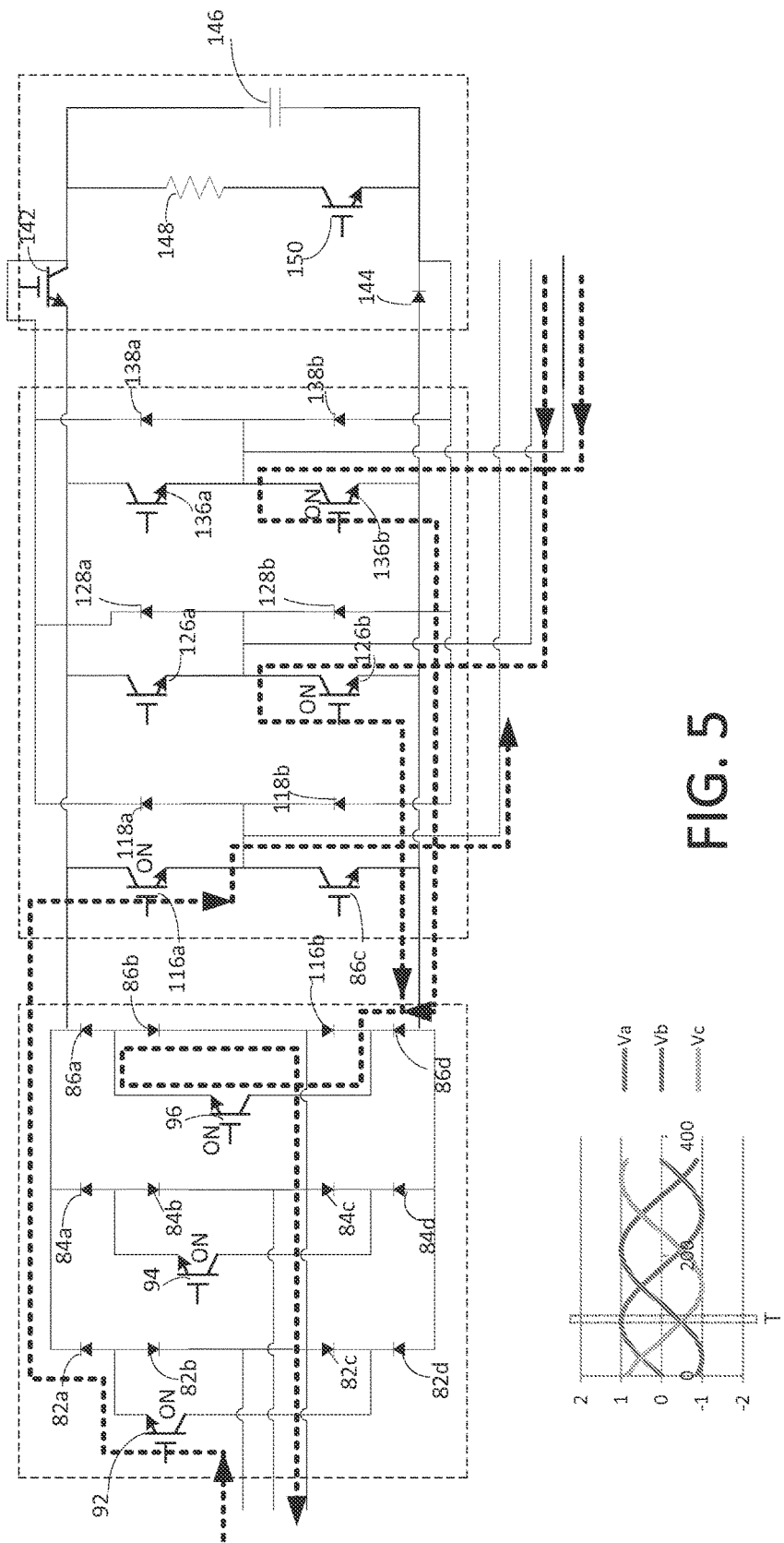
FIG. 5 is a circuit diagram of the matrix converter of FIG. 2, illustrating a normal operation of the matrix converter.

FIG. 5 is a circuit diagram of the matrix converter 14 of FIG. 2, illustrating a normal operation of the matrix converter 14. In the normal mode of operation, the matrix converter 14 converts the AC input power 22 flowing through the three-phase input connection 42 into the AC output power 24 at the three-phase output connection 44. This AC-to-AC conversion is performed by selectively controlling the IGBTs 92, 94 and 96 of the controlled rectifier input stage 36 and the IGBTs 116a, 116b, 126a, 126b, 136a and 136b of the inverter output stage 38 by the control system 16 or another control unit based on several factors including phases of the three-phase AC input power 22. For example, as shown in FIG. 5, a first voltage Va at the first input terminal 52 is positive, a second voltage Vb at the second input terminal 54 is negative, and a third voltage Vc at the third input terminal is negative (Vc has an absolute value greater than Vc) at time T. At the time T, the control system 16 turns on the IGBTs 92, 94 and 96 of the controlled rectifier input stage 36 and turns on the IGBTs 116a, 126b and 136b of the inverter output stage 38 so as to select current flow paths, as depicted in FIG. 5. As such, the IGBTs of the matrix converter 14 are selectively controlled to perform AC-to-AC conversion as desired, depending on the phases of the three-phase AC input power 22.

FIG. 6 is a circuit diagram of the matrix converter 14 of FIG. 2, illustrating a regenerative mode of operation of the matrix converter 14. In the regenerative mode of operation, the load or the motor 26 generates energy. As shown in FIG. 6, the inverter output stage 38 operates to draw the energy generated by the motor 26 through paths defined by some of the diodes 118a, 118b, 128a, 128b, 138a and 138b and deliver it to the energy storing element 146 and/or the energy dissipating element 148, as described above. As illustrated in FIG. 6, the controlled rectifier input stage 36 and the power source 18 are not affected by the operation of the regenerative circuitry 48. Furthermore, during the the regenerative mode the IGBTs 116a, 116b, 126a, 126b, 136a and 136b are in off mode (no current follows through these devices).

Figure 7:
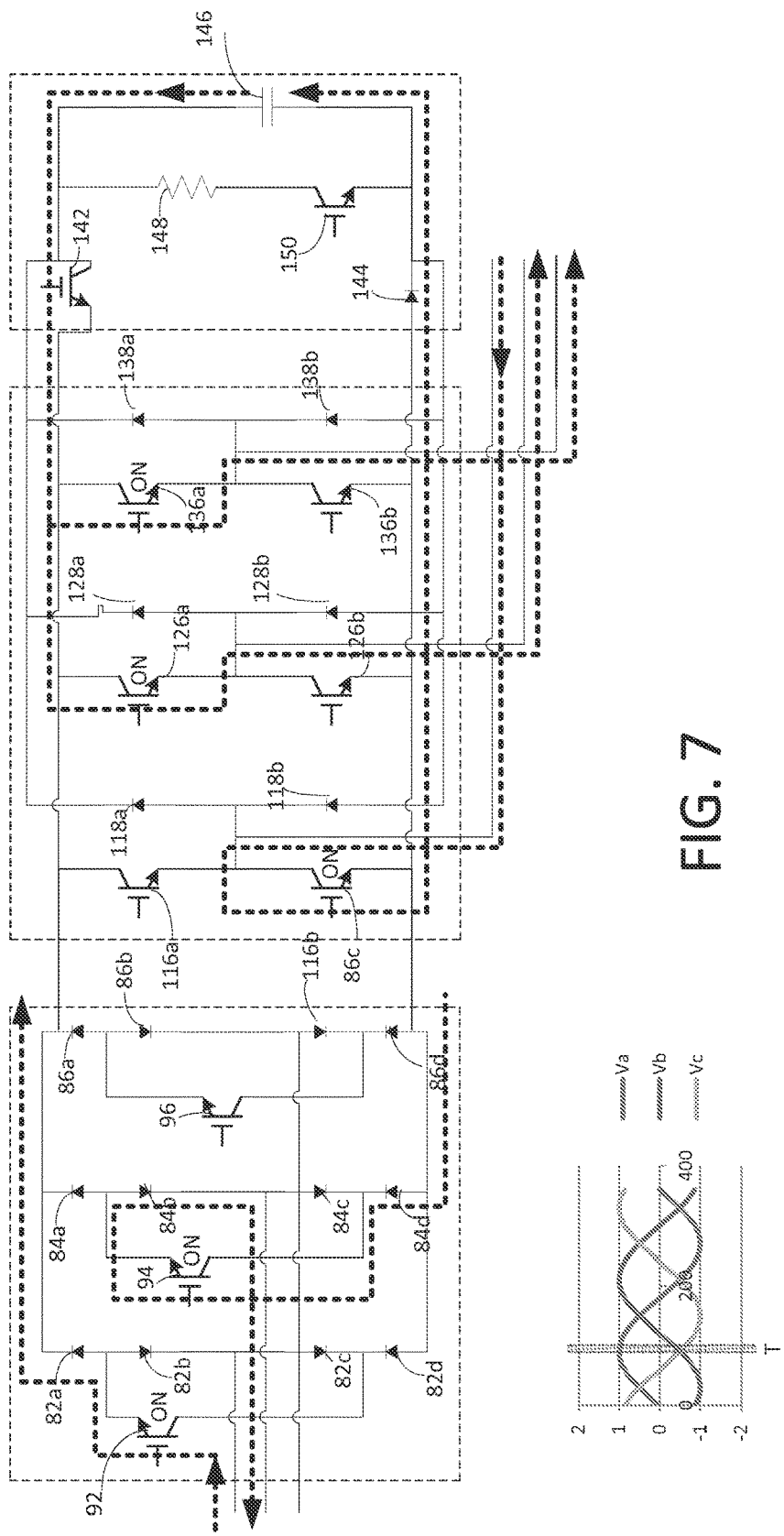
FIG. 7 is a circuit diagram of the matrix converter of FIG. 2, illustrating that the energy stored in the energy storing element is delivered back to the Motor.

FIG. 7 is a circuit diagram of the matrix converter 14 of FIG. 2, illustrating that the energy stored in the energy storing element 146 is fed back to the motor 26. When a voltage across the energy storing element 146 is equal to, or greater than, a preset threshold level, the intermediate unidirectional switch 142 is turned on through a control signal to allow energy stored in the energy storing element 146 to be discharged therefrom and fed back to the motor 26 through the inverter output stage 38 and the intermediate diode 144. When a voltage across the energy storing element 146 is less than the threshold level, the intermediate unidirectional switch 142 is turned off to prevent the stored energy from being discharged therethrough. In some examples, the threshold level used to control the intermediate unidirectional switch 142 is set to be greater than a voltage at the intermediate DC links 46. In other examples, the threshold level is set as a voltage at the intermediate DC links 46. By selectively controlling the IGBTs of the inverter output stage 38, as shown in FIG. 7, the energy stored in the energy storing element 146 can be delivered back to the motor 26 through the three-phase output connection 44.

From the forgoing detailed description, it will be evident that modifications and variations can be made in the aspects of the disclosure without departing from the spirit or scope of the aspects.

What is claimed is:

1. A matrix converter comprising:
a controlled rectifier input stage electrically connected to a power source and configured to convert AC input power from the power source into DC power, wherein the controlled rectifier input stage is configured to be unidirectional;
an inverter output stage electrically connected to a load and configured to convert the DC power into AC output power, the AC output power fed into the load, the inverter output stage including a plurality of unidirectional switch elements and a plurality of diodes; and
a regenerative unit electrically connected to the inverter output stage and configured to control energy generated by the load in a regenerative mode within the inverter output stage, the regenerative unit being directly connected to the plurality of diodes in parallel to enable the energy to be drawn to the inverter output stage through paths defined by at least one of the plurality of diodes and delivered to the regenerative unit and prevent the energy from flowing into the controlled rectifier input stage in the regenerative mode.

2. The matrix converter of claim 1, wherein the regenerative unit includes an energy dissipating element configured to dissipate the energy generated by the load in the regenerative mode.

3. The matrix converter of claim 1, wherein the regenerative unit includes an energy storing element configured to store the energy generated by the load in the regenerative mode.

4. The matrix converter of claim 3, wherein the regenerative unit is configured to deliver the energy stored in the energy storing element to the load through the inverter output stage when a voltage across the energy storing element is greater than a threshold.

5. The matrix converter of claim 1, wherein the regenerative unit comprises:
an energy dissipating element configured to dissipate the energy generated by the load in the regenerative mode; and
an energy storing element arranged in parallel with the energy dissipating element and configured to store the energy generated by the load in the regenerative mode.

6. The matrix converter of claim 5, wherein the energy dissipating element is a resistor.

7. The matrix converter of claim 5, wherein the energy storing element is a capacitor.

8. The matrix converter of claim 1, wherein the regenerative unit comprises:
an energy dissipating element configured to dissipate the energy generated by the load in the regenerative mode;
a switch element arranged in series with the energy dissipating element;
an energy storing element arranged in parallel with the energy dissipating element and the switch element and configured to store the energy generated by the load in the regenerative mode; and a control system configured to control the switch element to adjust a voltage across the energy storing element.

9. The matrix converter of claim 8, wherein the switch element is a three-terminal power semiconductor device.

10. The matrix converter of claim 1, wherein the regenerative unit is configured to deliver the energy generated by the load in the regenerative mode into the load.

11. The matrix converter of claim 1, further comprising:
a three-phase AC input connection having first, second, and third input terminals for receiving the AC input power from the power source, wherein the AC input power has three phases; and
a three-phase AC output connection having first, second, and third output terminals for providing the AC output power to the load, wherein the AC output power has three phases,
wherein the controlled rectifier input stage includes first, second, and third input leg circuits and first and second DC links, the first, second, and third input leg circuits electrically connected to the first, second, and third input terminals, respectively, and electrically connected to the first and second DC links, and configured to convert the AC input power into DC power and provide the DC power to the first and second DC links;
wherein the inverter output stage includes first, second, and third output leg circuits, the first, second, and third output leg circuits electrically connected to the first and second DC links and electrically connected to the first, second, and third output terminals, respectively, and, configured to convert the DC power from the first and second DC input terminals into the AC output power and provide the AC output power to the first, second, and third output terminals; and
wherein the regenerative unit is electrically connected to the first, second, and third output leg circuits of the inverter output stage.

12. The matrix converter of claim 11, wherein the regenerative unit includes an energy dissipating element electrically connected in parallel to each of the first, second, and third output leg circuits of the inverter output stage to dissipate the energy generated by the load in the regenerative mode.

13. The matrix converter of claim 11, wherein the regenerative unit includes an energy storing element electrically connected in parallel to each of the first, second, and third output leg circuits of the inverter output stage to store the energy generated by the load in the regenerative mode.

14. The matrix converter of claim 13, wherein the regenerative unit is configured to deliver the energy stored in the energy storing element to the load through the inverter output stage when a voltage across the energy storing element is greater than a threshold.

15. The matrix converter of claim 14, wherein the threshold is greater than a voltage across the first and second DC links.

16. A matrix converter comprising:
a three-phase AC input connection having first, second, and third input terminals for receiving three-phase AC input power from a power source;
a three-phase AC output connection having first, second, and third output terminals for providing three-phase AC output power to a load;
a controlled rectifier input stage having first, second, and third input leg circuits and first and second DC links, the first, second, and third input leg circuits electrically connected to the first, second, and third input terminals, respectively, and electrically connected to the first and second DC links, and configured to convert the three-phase AC input power into DC power and provide the DC power to the first and second DC links;
an inverter output stage having first, second, and third output leg circuits, the first, second, and third output leg circuits electrically connected to the first and second DC links and electrically connected to the first, second, and third output terminals, respectively, and, configured to convert the DC power from the first and second DC input terminals into the three-phase AC output power and provide the three-phase AC output power to the first, second, and third output terminals; and
a regenerative unit electrically connected to the first, second, and third output leg circuits of the inverter output stage and configured to control energy generated by the load in a regenerative mode within the inverter output stage.

17. The matrix converter of claim 16, wherein each of the first, second, and third input leg circuits of the controlled rectifier input stage is configured to be unidirectional.

18. The matrix converter of claim 16, wherein the regenerative unit includes an energy dissipating element electrically connected in parallel to each of the first, second, and third output leg circuits of the inverter output stage to dissipate the energy generated by the load in the regenerative mode.

19. The matrix converter of claim 16, wherein the regenerative unit includes an energy storing element electrically connected in parallel to each of the first, second, and third output leg circuits of the inverter output stage to store the energy generated by the load in the regenerative mode.

20. The matrix converter of claim 19, wherein the regenerative unit is configured to deliver the energy stored in the energy storing element to the load through the inverter output stage when a voltage across the energy storing element is greater than a threshold.

21. The matrix converter of claim 20, wherein the threshold is greater than a voltage across the first and second DC links.

22. The matrix converter of claim 16, wherein the regenerative unit comprises:
an energy storing element electrically connected in parallel to each of the first, second, and third output leg circuits of the inverter output stage to store the energy generated by the load in the regenerative mode;
an energy dissipating element;
a switch element arranged in series with the energy dissipating element, wherein the energy dissipating element and the switch element are arranged in parallel with the energy storing element; and
a control system configured to control the switch element to adjust a voltage across the energy storing element.

23. The metric converter of claim 16, wherein each of the first, second, and third output leg circuits of the inverter output stage includes an upper arm and a lower arm, the upper arm and the lower arm electrically connected in series, each of the upper and lower arms having a unidirectional switch element and an anti-parallel diode.

24. A matrix converter comprising:
a controlled rectifier input stage electrically connected to a power source and configured to convert AC input power from the power source into DC power, wherein the controlled rectifier input stage is configured to be unidirectional;

an inverter output stage electrically connected to a load and configured to convert the DC power into AC output power, the AC output power fed into the load; and a regenerative unit electrically connected to the inverter output stage and configured to control energy generated by the load in a regenerative mode within the inverter output stage, wherein the energy does not flow into the controlled rectifier input stage in the regenerative mode, the regenerative unit including:

an energy dissipating element configured to dissipate the energy generated by the load in the regenerative mode;

a switch element arranged in series with the energy dissipating element;

an energy storing element arranged in parallel with the energy dissipating element and the switch element and configured to store the energy generated by the load in the regenerative mode; and a control system configured to control the switch element to adjust a voltage across the energy storing element.

25. A matrix converter comprising:

a controlled rectifier input stage electrically connected to a power source and configured to convert AC input power from the power source into DC power, wherein the controlled rectifier input stage is configured to be unidirectional;

an inverter output stage electrically connected to a load and configured to convert the DC power into AC output power, the AC output power fed into the load;

a regenerative unit electrically connected to the inverter output stage and configured to control energy generated by the load in a regenerative mode within the inverter output stage, wherein the energy does not flow into the controlled rectifier input stage in the regenerative mode, a three-phase AC input connection having first, second, and third input terminals for receiving the AC input power from the power source, wherein the AC input power has three phases; and a three-phase AC output connection having first, second, and third output terminals for providing the AC output power to the load, wherein the AC output power has three phases, wherein the controlled rectifier input stage includes first, second, and third input leg circuits and first and second DC links, the first, second, and third input leg circuits electrically connected to the first, second, and third input terminals, respectively, and electrically connected to the first and second DC links, and configured to convert the AC input power into DC power and provide the DC power to the first and second DC links;

wherein the inverter output stage includes first, second, and third output leg circuits, the first, second, and third output leg circuits electrically connected to the first and second DC links and electrically connected to the first, second, and third output terminals, respectively, and, configured to convert the DC power from the first and second DC input terminals into the AC output power and provide the AC output power to the first, second, and third output terminals; and wherein the regenerative unit is electrically connected to the first, second, and third output leg circuits of the inverter output stage.

26. The matrix converter of claim 25, wherein the regenerative unit includes an energy dissipating element electrically connected in parallel to each of the first, second, and third output leg circuits of the inverter output stage to dissipate the energy generated by the load in the regenerative mode.

27. The matrix converter of claim 25, wherein the regenerative unit includes an energy storing element electrically connected in parallel to each of the first, second, and third output leg circuits of the inverter output stage to store the energy generated by the load in the regenerative mode.

28. The matrix converter of claim 25, wherein the regenerative unit is configured to deliver the energy stored in the energy storing element to the load through the inverter output stage when a voltage across the energy storing element is greater than a threshold.

29. The matrix converter of claim 28, wherein the threshold is greater than a voltage across the first and second DC links.

* * * * *